Nov. 9, 1943.    H. V. LUDWICK    2,333,803
SECURING MEANS FOR BLEACHER SEATS
Original Filed Sept. 20, 1940

INVENTOR.
Herbert V. Ludwick
BY Edward M. Apple
Attorney

Patented Nov. 9, 1943

2,333,803

UNITED STATES PATENT OFFICE 2,333,803

SECURING MEANS FOR BLEACHER SEATS

Herbert V. Ludwick, Dearborn, Mich.

Original application September 20, 1940, Serial No. 357,566. Divided and this application August 23, 1941, Serial No. 408,034

3 Claims. (Cl. 155—130)

This invention relates to bleacher assemblies and particularly to means for securing the seat and floor boards in position. This application is a division of my co-pending application, S. N. 357,566, filed September 20, 1940, which became a patent on March 24, 1942, No. 2,277,594.

An object of the invention is the provision of a seat securing device which will take the thrust of the seats in all directions.

Another object of the invention is the provision of a device which will secure the bleacher seats and floor boards in position and will permit them to be readily removed when desired.

Another object of the invention is the provision of a device which serves as spacers between the supporting members of the bleacher seats.

The foregoing objects and other advantages of the invention will appear as the description proceeds, reference being made from time to time to the accompanying drawing, in which.

Figure 1:
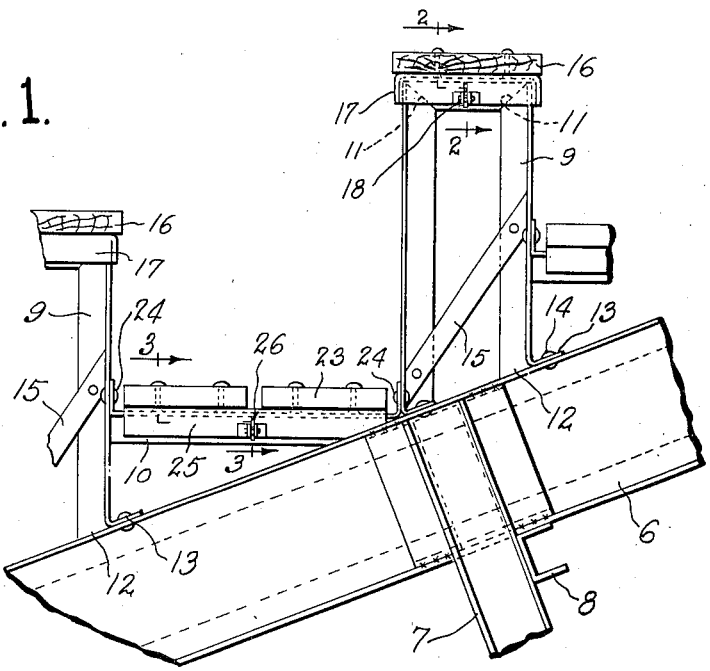
Fig. 1 is an enlarged fragmentary detail of a bleacher structure embodying my invention.

Referring now more particularly to the drawing, it will be seen that in the embodiment herein disclosed, the reference character 6 indicates a stringer which is supported by means of the jack 7, the cross member of which is shown as at 8. The jack 7 is preferably a rectangular assembly made up of a plurality of channel members welded together and braced by the channel shaped cross member 8, and reinforced by cross members (not shown) but illustrated and described more particularly in my copending application referred to above. The seat supports 9 and foot board supports 10 are arranged above the stringers 6, and are directly supported thereby. The seat supports 9 are formed of angle iron having a T-shaped cross section (Fig. 2) and notched as at 11, and bent to form inverted U-shaped brackets. The free ends of the brackets are cut so that one leg of the T rests on the stringers 6, as at 12. The other legs of the T are bent as at 13, the bent ends 13 being secured to the stringers 6 by means of rivets 14 or other suitable means.

Figure 2:
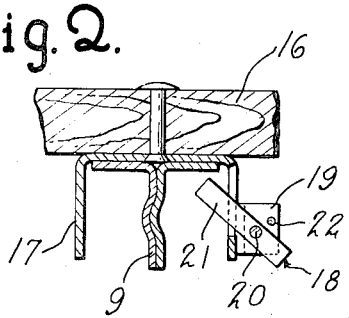
Fig. 2 is a section taken substantially on the line 2—2 of Fig. 1.
Figure 3:
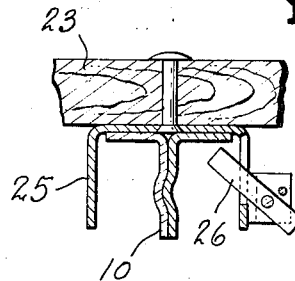
Fig. 3 is a section taken substantially on the line 3—3 of Fig. 1.
Figure 4:
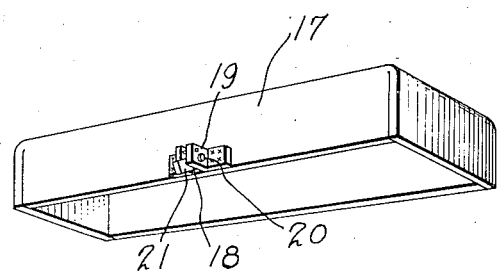
Fig. 4 is an enlarged perspective view of one of the caps used in connection with the seats.

I prefer to brace the seat brackets 9 by welding or riveting the cross members 15 thereto, as shown in Fig. 1. The seat boards 16 have depending from their under sides inverted cup-like members 17 which are adapted to fit over the upper portions of the brackets 9 and prevent the seat boards 16 from being displaced laterally in any direction. In order to prevent the seat boards 16 from being displaced, I provide a locking device 18 for each end of the seat. The locking device 18 consists of a pair of ears (Fig. 2) 19, formed on the member 17, into which is pivoted, at 20, a flat latch member 21. The latch member 21 is balanced so that it normally rests in angular position as shown in Fig. 2, so that its upper end engages under the upper portions of the brackets 9. This permits each of the seat boards 16 to be readily placed in position, for as it moves downwardly, the latch 21 is swung out of the way, and when the seat boards are in position of rest the latch 21 swings into locking position, as shown in Fig. 2. The latch 21 is easily swung out of locking position by hand if it is desired to remove the board 16 from the brackets 9, but any unintentional upward movement of the boards 16 is prevented when the latch is in position as shown in Figs. 2 and 3. The latch 21 is limited in upward swing by means of a stop 22, and the bottom of the slot in which it operates.

The foot boards 23 are supported by bridge members 10 which are made up of two angle irons welded together to form a T as shown in Fig. 3, and which are secured by rivets 24 or by welding to the seat brackets 9, as shown in Fig. 1. The foot boards 23 have depending channel members 25 adapted to fit over the bridge members 10 and are secured thereto by latches 26, similar to the latches 21 already described, so that they cannot be accidentally upwardly displaced.

Having described my invention, what I claim and desire to secure by Letters Patent is:

1. In a portable bleacher construction, including inclined stringers supported by rectangular jacks, and seat board supports, the combination of seat boards on said seat board supports, each of said seat boards having rectangular cup-like members depending from its underside, each of said cup-like members embracing the upper portion of one of said seat board supports, whereby the said seat boards are held against lateral displacement in any direction.

2. The combination defined in claim 1, wherein each cup-like member is provided with a pivoted latch which is arranged to engage a portion of the adjacent seat board support, whereby the seat board is held against upward displacement.

3. The combination defined in claim 1, wherein each cup-like member is provided with a pivoted latch, which is arranged to move in a vertical plane and which is arranged to engage a portion of the seat board support and lock the parts together, only upon the upward movement of the seat board.

HERBERT V. LUDWICK.